Aug. 6, 1935.   H. H. GERMOND   2,009,997
MEANS FOR INDICATING VIBRATIONS IN MACHINERY AND THE LIKE
Filed Sept. 28, 1931   4 Sheets-Sheet 1

Witness:
Chas. R. Koursh

Inventor,
Hallett H. Germond,

Aug. 6, 1935.   H. H. GERMOND   2,009,997
MEANS FOR INDICATING VIBRATIONS IN MACHINERY AND THE LIKE
Filed Sept. 28, 1931   4 Sheets-Sheet 2

Witness:
Chas. R. Toush.

Inventor:
Hallett H. Germond

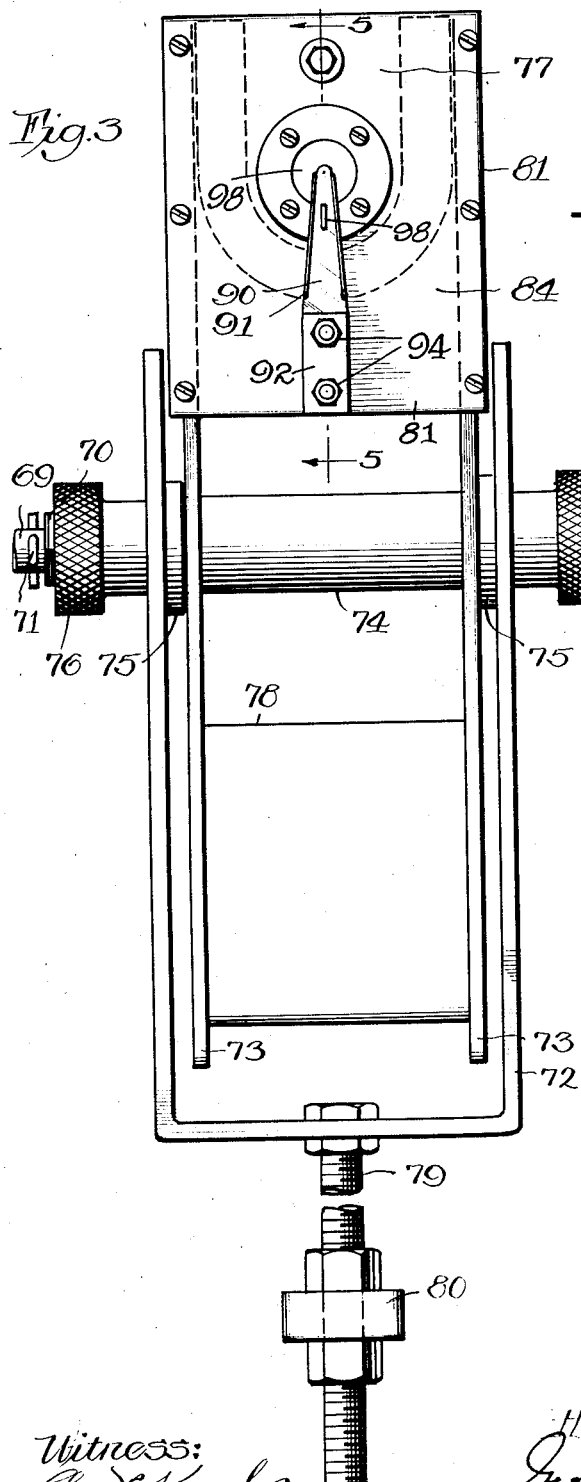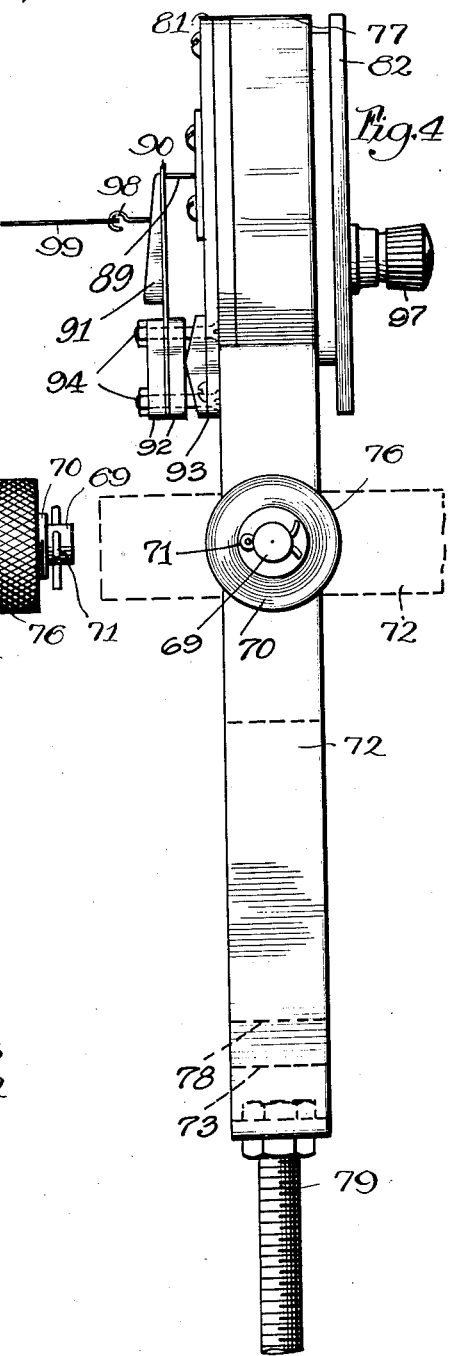

Aug. 6, 1935.                    H. H. GERMOND                     2,009,997
           MEANS FOR INDICATING VIBRATIONS IN MACHINERY AND THE LIKE
                      Filed Sept. 28, 1931        4 Sheets-Sheet 4
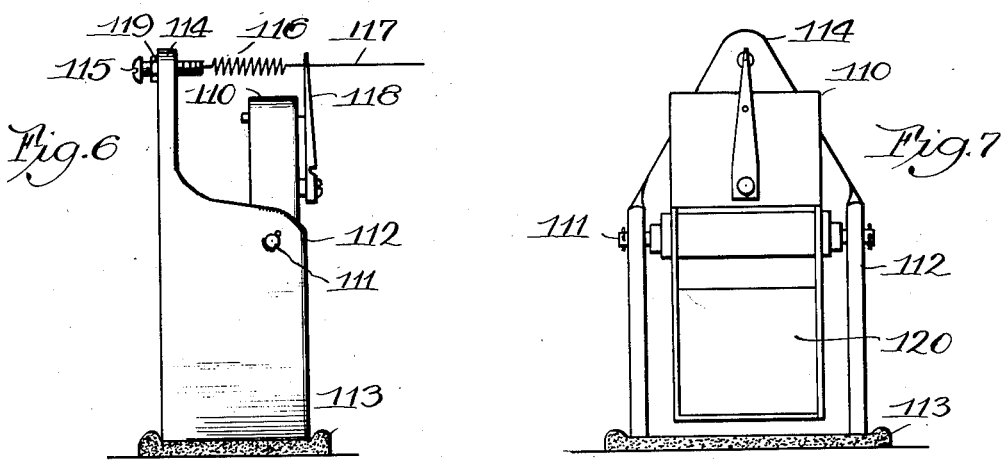
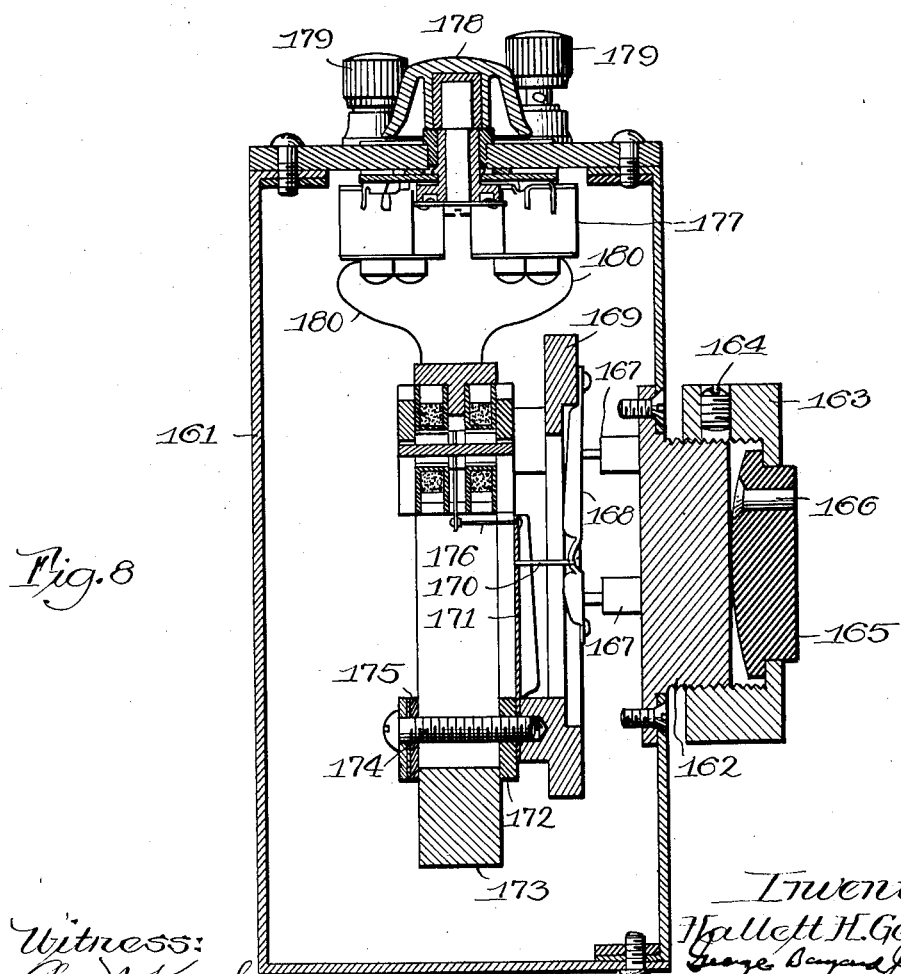

Patented Aug. 6, 1935

2,009,997

UNITED STATES PATENT OFFICE 2,009,997

MEANS FOR INDICATING VIBRATIONS IN MACHINERY AND THE LIKE

Hallett H. Germond, Madison, Wis., assignor to C. F. Burgess Laboratories, Inc., Madison, Wis., a corporation of Delaware Application September 28, 1931, Serial No. 565,511

15 Claims. (Cl. 177—351)

This invention relates to apparatus for transforming mechanical energy into electrical energy, particularly the energy contained in mechanical vibrations such as are set up in machinery. In its practical aspects, the invention relates to the detection and measurement of vibrations caused by defects or other undesirable conditions which may exist in machinery. The invention is adapted for use in connection with an instrument which is capable of measuring the energy contained in electrical vibrations, such instruments being known.

The invention has for its object the provision of apparatus for transforming mechanical energy into electrical energy, called more simply, a pick-up, which produces electrical vibrations which correspond very faithfully in character to the mechanical vibrations of the vibrating subject and is affected only to a minimum degree by extraneous vibrations.

A particular application of the invention is the provision of a pick-up device for testing for mechanical vibrations set up by ball bearings when in use due to imperfections therein such as surface roughness and surface flaws of the balls and races, the presence of dirt, imperfect roundness of the balls, eccentricity of the races, etc. By making certain modifications the device may be adjusted for testing for vibrations of practically any type of machinery.

Fig. 3 is a front view of a different type of device which is adapted for picking up vibrations of ball bearings and also other kinds of mechanical vibrations but which utilizes the principle of my invention;

Fig. 4 is a side view of the device shown in Fig. 3;

Fig. 6 is a side view of a modification of the pick-up device shown in Figs. 3, 4, and 5;

Fig. 7 is a front view of the pick-up shown in Fig. 6;

Fig. 8 is a sectional side view of a further type of pick-up device which is essentially a modification of the device shown in Figs. 1 and 2.

Figure 1:
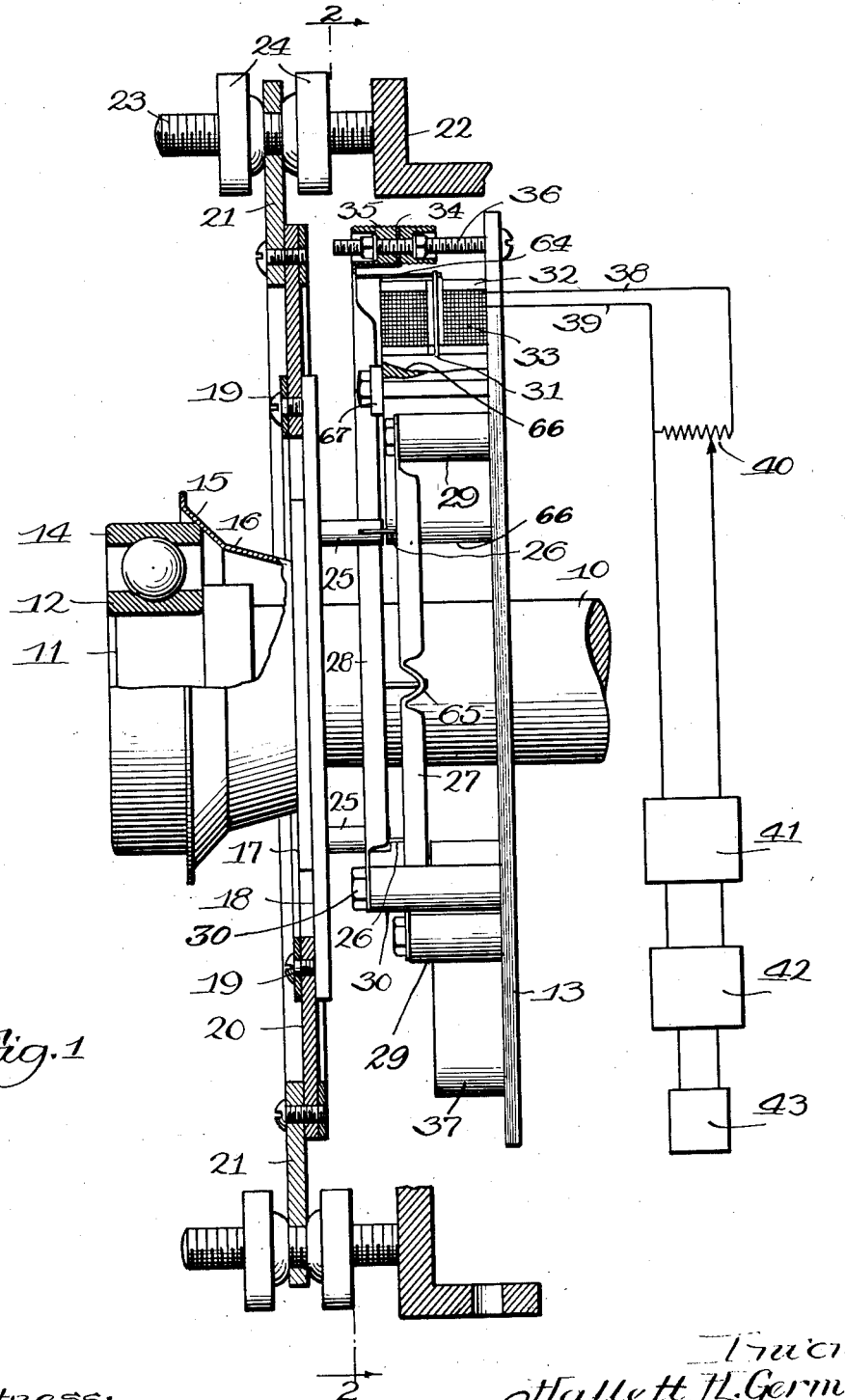
Fig. 1 is a partially broken side view of a device for picking up vibrations due to imperfections of ball bearings together with a diagrammatic representation of an amplifying and metering system which is connected to the pick-up device.
Figure 2:
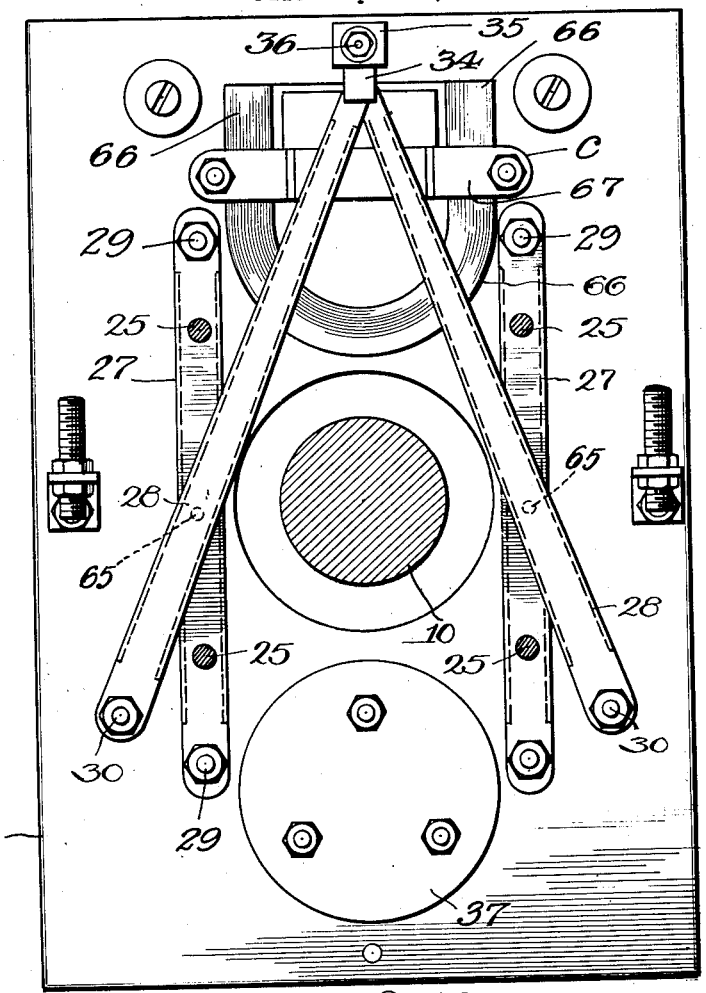
Fig. 2 is a view on line 2—2 of Fig. 1.

The device shown in Figs. 1 and 2 includes, in general terms, a mechanism for causing relative rotation of the outer and inner bearing races of a ball bearing. Any imperfections of the bearings will cause relative vibration between the two which will be superimposed upon the vibrations of the mechanism causing rotation. The device has a probe or pick-up which is highly responsive to such vibrations. Connected to the vibration pick-up is a translating device for translating mechanical into electrical vibrations. Connected to the translating device is a filter and amplifier, the latter preferably of the vacuum tube type. The filter is adapted to suppress, sufficiently for practical purposes, the passage of vibrations which are caused by other sources than the imperfections of the ball bearing. The amplifier is adapted to increase the translated electrical energy to such an extent that it can be measured accurately by a suitable meter.

Referring to Fig. 1, a supporting spindle 10 is provided, suitably mounted upon quiet-running bearings, preferably of the sleeve type and is adapted to be rotated by a suitable quiet-running motor (not shown). The end portion of spindle 10 may be reduced to form a shoulder and to accommodate adapter 11 which is essentially a flanged cylinder. A number of adapters of different sizes should be provided to take care of different sized ball bearings. The inside diameter of the different sizes of adapters is preferably the same in all cases and it forms a snug fit upon the end portion of spindle 10. Screw thread engagement may be provided between the adapter and the spindle. The outer diameter of adapter 11 varies with the different sizes and is arranged to form a snug fit with the inside surface of the inner race 12 of the ball bearing. The end of adapter 11 rests against the shoulder near the end of spindle 10 and the side of the inner race of the ball bearing rests against the flange of the adapter. The inner race 12 rotates with adapter 11, which in turn rotates with spindle 10.

Contacting diagonally with an outer peripheral edge of outer race 14 of the ball bearing is a frusto-conical section 15 of a contacting or probing element. Continuing from section 15 is a diverging second frusto-conical section 16 which, in turn, terminates in circular base ring 17 with which it may be integral or otherwise suitably rigidly connected. Base ring 17 is rigidly mounted upon face plate 18 which may also be circular in shape. To the peripheral portion of face plate 18 there is fastened, as by means of bolts 19, an annular ring or diaphragm 20 of resilient material such as rubber. A narrow annular rim of metal or other suitable hard material may be fastened as shown between the heads of bolts 19 and resilient material 20. To the outer periphery of diaphragm 20 there is similarly fastened a supporting plate 21 which is mounted in an adjustable manner. At 22 is shown a fragment of a rigidly mounted frame work from which bolt 23 projects. Bolt 23 passes through a hole in plate 21 and thus supports the latter. Thumb nuts 24 may be used to adjust the lateral position of supporting plate 21. In a similar manner the lower portion of supporting plate 21 is mounted in a laterally adjustable manner. Plate 21 is preferably of rectangular shape and by locating one support in the middle of the top portion and one at each side at or near the bottom, complete lateral adjustment is possible. By moving plate 21 toward and away from the ball bearing the pressure between the latter and the contact member or probing device may be adjusted to regulate to some extent the pressure of the vibrations set up in the contact members in response to the vibrations of the bearing. Furthermore, the alignment of the probing device may be regulated to effect continuous contact with the edge of the outer race of the ball bearing. Means may also be provided in connection with frame 22 to adjust the vertical position of the probing device.

Mounted upon the rearward side of face plate 18 are studs 25 in the ends of which are embedded rods 26. As is shown in Fig. 2 there are four each of studs 25 and rods 26. The opposite ends of rods 26 are fastened to levers 27. As shown in Fig. 2, there are two levers 27. It is noted that levers 27 are flanged except for short portions at the ends and middle. Flexing of the levers is therefore confined to the unflanged portions. Levers 27 are fastened at their ends to studs 29 which are in turn mounted upon back plate 13. The middle portion of levers 27 are connected to adjacent portions of levers 28 by means of links 65. As shown in Fig. 2, levers 28 are in the shape of an inverted V, the lower ends of the diverging legs being mounted upon studs 30, which are in turn mounted upon back plate 13. The upper end of the lever, as a whole, at the junction of the V, is free to vibrate. Rod 64 connects the free end of said lever to armature 31 which is in the form of a flat plate pivoted midway between pole pieces 32 and within coil 33 of an electromagnetic system which includes permanent magnet 66, held in place by a strap 67 (see Fig. 2). Movement of the armature within the field of the electromagnet develops various voltage values in winding 33. Suitable output terminals 38 and 39 are connected to the winding and there is preferably included in this output circuit a potential dividing device and suitable terminals to permit subdividing the output potential into desired steps.

Lever 28 continues beyond the junction of the V in the form of a tongue 34 which may vibrate between two bumper blocks 35 of elastic material such as rubber. Bumper blocks 35 may be mounted in any suitable manner and are shown mounted upon bolts 36 and held in place by means of suitable sockets and nuts. The free vibration of lever 28 may thus be damped to any desired extent.

No independent rigid support is furnished for back plate 13, the latter being supported merely by the lever system through studs 29, the V-shaped lever being ultimately supported through diaphragm 20 by supporting plate 21. The relative movement between armature 31 and the relatively stationary magnet and coil member depends upon the inertia of back plate 13 and that portion of the mechanism which is mounted upon the latter. This property may be regulated to some extent by weights, such as are shown at 37, which weights, if properly designed, may be made to serve also the purpose of dynamically balancing the mass of the quasi-stationary system about its supports. The points at which the contactor is connected to the lever system, namely the point of attachment of rods or pins 26 to levers 27, constitutes the energy input of the lever system; the point at which armature 31 is connected represents the output, and the points at which back plate 13 is connected represents the fulcrum of the lever system. The arrangement of the levers is such that the mechanical vibrations are amplified at the output of the system. The lever system, by its resiliency, tends to maintain the armature in its normal position midway between the pole pieces 32 and resists the vibratory motion of the contactor and hence the relative motion between the armature and the magnet and coil member.

To winding 33 there are connected the conventional output leads 38 and 39, shown schematically in Fig. 1, one of which may be connected directly to the audio amplifier input while the other may be connected to a potential dividing device 40 for the purpose of regulating the energy transmitted to the amplifier 42, which may be of the vacuum tube type. There may be a filter 41 connected in the amplifier input or between stages of the amplifier for the purpose of eliminating vibrations due to characteristics of the subject which are of no interest and those produced by the testing equipment. The output energy of amplifier 42 is conducted to meter 43. Branch output circuits may be provided for loud speakers to produce an audible indication of the nature of the vibrations or for oscillographs to produce records for analysis of the vibrations. The device shown in Figs. 1 and 2, with suitable modifications, may be adapted for testing roller bearings.

Vibration pick-up units in which the relatively stationary position of one of the cooperating members of the magneto-electric device is maintained by inertia have been found to be particularly advantageous in that there is obtained more faithful energy response and reproduction of the actual characteristics of the vibrations of the subject.

Figure 5:
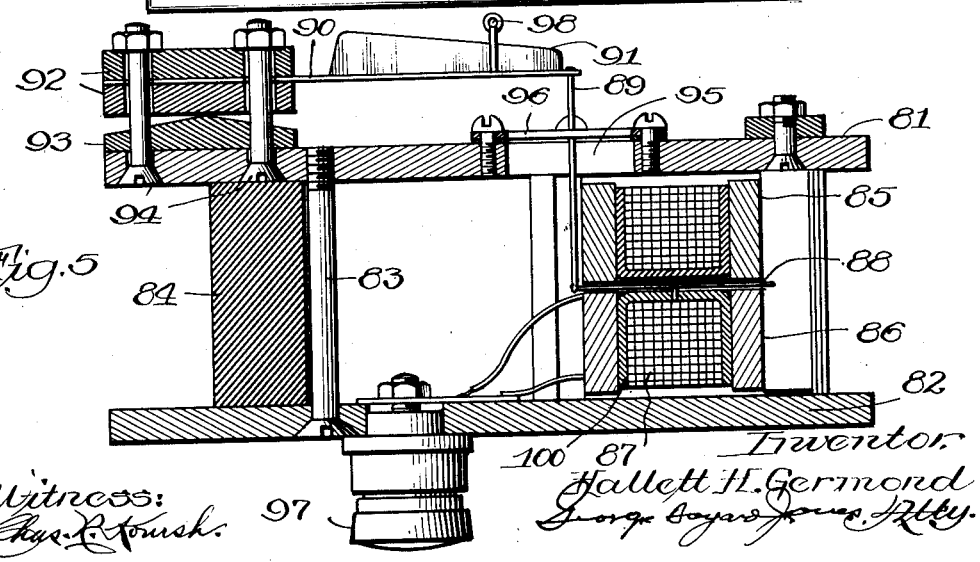
Fig. 5 is a sectional side view of a portion of the device on the line 5—5 of Fig. 3.

Another pick-up device involving this principle is illustrated in Figs. 3, 4 and 5. In this device shaft 69 is adapted to be mounted upon a suitable stationary support (not shown). Such support is entirely independent of the subject to be tested. Metal sleeve 70 is fitted rotatably over shaft 69 and confined longitudinally by any suitable means such as cotter pins 71 which are held in holes in shaft 69. U-shaped metal yoke 72 is mounted pivotally upon sleeve 70. Side bars 73 of a frame which supports a magneto-electric device are similarly mounted upon sleeve 70. Between side bars 73 and yoke 72 are washers 75. The exterior surface of sleeve 70 may be threaded for the reception of thumb nuts 76. When thumb nuts 76 are moved apart yoke 72 and side bars 73 become loose upon sleeve 70, and may be pivoted into any desired position. When thumb nuts 76 are moved together yoke 72, side bars 73, washers 75 and cylinder 74 are compressed together in rigid relation but the whole may still be pivoted freely upon shaft 69. Mounted between side bars 73 at one end thereof is magneto-electric translating device 77, and upon the other end is mounted a counter-balancing weight 78. Threaded bolt 79 is fastened to the closed end of yoke 72 and extends radially away from shaft 69. Thumb nut 80 is mounted in adjustable fashion upon bolt 79.

The magneto-electrical device may be of any well known type. The one illustrated in Fig. 5 has been found to be suitable. Supporting plates 81 and 82 are mounted upon side bars 73 as shown in Fig. 3. Between plates 81 and 82 there is mounted in fixed position an assembly comprising a horse-shoe shaped permanent magnet 84, pole pieces 85 and 86 and coil 87. Bolts such as bolt 83 may be used to hold the assembly in position. Between the windings of coil 87 there is mounted an armature 88 which is in the shape of a thin rectangular plate pivoted at its midportion upon frame 100 which is mounted within coil 87.

Rod 89 is fastened between the end of armature 88 and the end of a lever 90. The latter is provided with a flange 91 along the greater portion of its length. Lever 90 is held rigidly between bars 92 which rest upon a transverse ridge upon bar 93 which in turn, rests upon supporting plate 81. Bars 92 and 93 are fastened to plate 81 by means of bolts 94. By loosening the nut on one of these bolts and tightening that on the other the position of lever 90 may be changed to allow for slight variations which may occur in the dimensions, etc. of each individual instrument and also to adjust the normal or at rest position of armature 88 with respect to coil 87 and pole pieces 85 and 86. The armature, when at rest, should lie exactly midway within the coil. Lever 90 resists displacement of armature 88 from its normal position.

The magnet system is enclosed on all sides to keep out dust and dirt and opening 95 is closed by means of diaphragm 96 which may be of paper and which is held in place by means of a bolted flange. Diaphragm 96 is pierced by rod 89. The lead wires of coil 87 are fastened to terminals 97 respectively. There is mounted upon lever 90 a ring 98 which is adapted to be connected to a vibrating subject by suitable means, as for instance, wire 99, shown in Fig. 4.

The pick-up device may be mounted in any suitable position, for instance, the position shown in Fig. 4. Yoke 72 may be mounted at an angle to side bars 73 as shown in dotted lines in Fig. 4. Magneto-electric device 77 is shown in a vertical position and is maintained in that position against the torque exerted by yoke 72 by means of wire 99 which is fastened at its other end to the subject under test. Thumb nut 80 is used as a weight and the torque exerted by yoke 72 when the latter is in an angular position, may be regulated by adjusting the position of said thumb nut. Thus the tension placed upon connection 99 and hence the degree of responsiveness or the pressure of the vibrations transmitted by connection 99 may be varied at will.

While it is possible to vary the torque exerted by yoke 72 by changing the angle from the vertical of the latter this is not recommended because of the difficulty encountered in such cases in reproducing exact conditions for each one of a series of tests. When the yoke is in the horizontal position slight variations in its angular position produce practically no difference in torque while as it approaches the vertical position such variations produce proportionately increasing differences in torque. The angular position of magneto-electric device 77 may be changed as desired. It is preferable to have the latter so positioned that wire 99 is perpendicular to lever 90. Changes in the torque exerted upon the device may require adjustments of the normal or at rest position of armature 88 with respect to coil 87.

The device shown in Figs. 6 and 7 is a modification of the device described immediately heretofore. The magneto-electric device 110 is similar to that shown in Figs. 3, 4 and 5 and is pivotally mounted upon shaft 111 which is mounted on frame 112 which is preferably heavy in order to add to the inertia of the system. Frame 112 rests upon a suitable vibration absorbing support 113 which may be a thick hair-felt pad. At the rear of frame 112 there is an upward projection 114. There is a threaded opening in the upper portion of projection 114 through which there is threaded an adjusting screw 115. A tension producing device 116, such as a coil spring, is fastened at one end to the forward end of adjusting screw 115. The other end of spring 116 is fastened to tension member 117 which may be of wire or other suitable material and which is connected at its opposite end to the subject under test. The wire is connected to arm 118 which is mounted upon the frame-work of magneto-electric device 110 and is connected to the armature of the latter. Arm 118 is considerably more flexible than the corresponding arm 90 of the device shown in Figs. 3, 4 and 5. The tension upon wire 117 may be adjusted by means of screw 115 which may be locked in position by nut 119. Magneto-electric device 110 is counterbalanced upon shaft 111 by means of weight 120. This device possesses the advantage that the magneto-electric device remains more stationary relative to its vibrating armature than is the case in connection with the previously described device while at the same time its response to extraneous vibrations is a minimum due to its inertia mounting. This is a condition to be desired since tests of this nature are usually conducted in locations where there is more or less moving machinery and the floors and benches are in a continual state of vibration. In the device shown in Figs. 6 and 7, it is not necessary to adjust the position of arm 118 to compensate for changes in tension upon connecting member 117.

From the foregoing description it is apparent that the pick-up device shown in Figs. 3, 4 and 5 is not only adapted for testing ball bearings but is rather general in its application and may be used in connection with any subject to which the connection 99 may be attached. A suitable point of attachment can be arranged upon practically any machine or device subject to vibrations. In using the pick-up for testing ball bearings it has been found that if the outer bearing race is held stationary by a suitable contact member such as is shown in Fig. 1 but which is mounted in a fixed position and if connection 99 is attached to some point upon the frame of the motor which revolves shaft 10, sufficiently accurate results are obtained. This is no doubt due to the fact that reaction from the vibrations of the bearing races is transmitted through shaft 10 to the motor and that this reaction is proportional to the vibratory energy impressed upon the contact member. Vibrations due to other causes than the ball bearing imperfections must be filtered out, as described heretofore, before they reach the energy measuring equipment. For tests of this nature the motor must run very smoothly and quietly.

In certain types of work the vibration responsive device or pick-up may remain connected to the vibrating subject throughout a series of tests. An instance of such a case is where it is desired to test the anti-knocking qualities of internal combustion engine fuel. Here the pick-up device may be connected more or less permanently to the engine and the desired changes in test conditions, such as change of fuel, load, time of ignition, etc., may be made without disturbing the pick-up connections.

For such class of work a pick-up as is illustrated in Fig. 8 may be used. The device is contained in a suitable case 161 which is preferably of metal. Upon one side of the case, which will be called the front, there is mounted a flanged circular stud 162, also preferably of metal. The flanges of stud 162 are screwed to the peripheral edges of a suitable opening in the front of case 161. Stud 162 is threaded externally to receive internally flanged nut 163. Set screw 164 is adapted to lock nut 163 in any desired position. The internal flange of nut 163 engages an external flange of coupling member 165. One side of coupling member 165 is provided with a convex surface and this surface is adapted to be maintained in firm contact with the adjacent surface of stud 162. In this manner a more or less point contact is provided between the coupling and the stud which is an advantage in transmitting vibrations. Coupling member 165 is provided with a number of countersunk holes 166 therethrough. The vibrating subject may be drilled in suitable locations to receive and hold bolts or screws and these are inserted through holes 166. Coupling 165 is thus fastened rigidly to the vibrating subject.

In the case of an internal combustion engine the holes may be drilled in any location upon the cylinder block, cylinder head, or elsewhere where suitable response to the vibrations caused by the knocking of fuel has been found to exist. In making the connection, nut 163 is first removed from the pick-up device and, with nut 163 and coupling 165 engaged by means of their flanges, coupling 165 is bolted to the engine. Then stud 162 is threaded into nut 163 by manipulating case 161.

Upon the rear surface of stud 162 there are mounted a number of posts 167. Posts 167 are connected to levers 168 which are connected at their ends to ring 169. Only one-half of one such lever is shown in Fig. 8, but the levers extend diametrically across ring 169 and are connected thereto at both ends and are flanged at the portions intermediate their ends and their middles. Flexing of the levers is therefore confined to the unflanged portions. The mid-portions of levers 168 are connected by means of rod 170 to lever 171 at a point near the free end of the latter. The fixed end of lever 171 is clamped between metal strap 172 and a protruding abutment of ring 169. Metal strap 172 rests at its end upon the legs of U-shaped permanent magnet 173 and is held in place by bolt 174 which, in turn, is held at its head by laminated strap 175 which rests against the opposite sides of the legs of magnet 173. Strap 175 is composed of a strip of metal resting against the magnet and strips of hard insulating fiber and phenol condensation material respectively in the order named proceeding from the metal strip.

Lever 171 is flanged throughout most of its length so that flexing is confined to the portion adjacent its supports. To the end of lever 171 is fastened rod 176 which is fastened to the armature of an electromagnet system similar to those which have been described heretofore. The output leads 180 from the coil of the electro-magnet system are connected to the input of a potential dividing device 177 which is mounted upon the top of case 161. The potential dividing device is not shown in detail since it merely consists of a number of connected spools of resistances and a movable contact adapted to be operated by knob 178, to selectively make connection with stationary contacts located upon the connections between resistances and also at the end of the series. One of the output terminals 179 may be connected directly to one of the input leads 180 while the other output terminal may be connected to the movable contact. Output terminals 179 are adapted to be connected to the amplifying system. It is understood that the potential dividing device need not be mounted upon the pick-up frame but is merely so mounted for convenience.

It will be noted that the pick-up device shown in Fig. 8 is also of the type in which one member of the magneto-electric device maintains its relatively stationary position by inertia. The stationary element has no support other than that which it receives from posts 167 through levers 168 and ring 169 to which permanent magnet 173 is fastened by means of bolt 174 and straps 172 and 175. Relative motion between the vibrating armature member and the quasi-stationary magnet and coil member is obtained by means of the inertia of the latter.

Where the vibrating subject has a surface of magnetic material, the vibrating element of the pick-up may be fastened to the subject by magnetic force. This is accomplished by substituting a suitable electromagnet for the coupling unit shown in Fig. 8. For instance, an electromagnet could be adapted to be screwed tightly upon stud 162. I have used such electromagnetically coupled pick-ups with very good success.

I claim:

1. Apparatus for responding to mechanical vibrations and converting such vibrations into electrical vibrations comprising, in combination, means adapted to make contact with the vibrating subject for responding to the vibrations thereof, means comprising a magneto-electric device for translating mechanical vibrations into electrical vibrations, said translating means comprising an armature member and a magnet and coil member, said members being adapted for relative motion, means comprising levers for transmitting said mechanical vibrations from said subject to said translating means and for amplifying said mechanical vibrations, portions of said levers being movable relative to other portions by means of flexure thereof, flexure being confined to predetermined portions of said levers, said magnet and coil member being fastened to and supported by the relatively stationary portions of said levers and maintaining its relatively stationary position by reason of its inertia.

2. Apparatus for converting mechanical vibrations set up in ball bearings under conditions simulating normal use, into electrical vibrations, comprising, in combination, means for rotating one of the bearing races upon a fixed axis, a contactor adapted to press against the other bearing race and arrest rotation thereof, a diaphragm support for said contactor, means for adjusting the position of said diaphragm, a magneto-electric device for translating mechanical vibrations into electrical vibrations, said magneto-electric device comprising an armature member and a magnet and coil member, said members being adapted for relative motion, a lever system for transmitting said mechanical vibrations from said contactor to said translating device, said lever system at its point of energy input being connected to and supported by said contactor, and being connected at its point of energy output to said armature member, said lever system at a third point being connected to and supporting said magnet and coil member, and the relatively stationary position of said magnet and coil member being maintained by the inertia thereof.

3. Apparatus for indicating the intensity of mechanical vibrations comprising, in combination, means comprising a magneto-electric device for translating mechanical vibrations into electrical vibrations, said magneto-electric device comprising a movable armature and a relatively stationary magnet and coil member, means comprising resilient members for transmitting mechanical vibrations from a vibrating subject to said translating means, said armature being connected to the energy output point of said resilient members, said magnet and coil member being attached to another point upon said resilient members, the relatively stationary position of said magnet and coil member being maintained by its inertia, means for amplifying said electrical vibrations, and means for indicating the energy contained in said amplified vibrations.

4. Apparatus for responding to mechanical vibrations and translating such vibrations into electrical vibrations comprising, in combination, a magneto-electric device for translating mechanical vibrations into electrical vibrations, said magneto-electric device comprising an armature member and a magnet and coil member, said members being adapted for relative motion, a resilient member resisting such relative motion, said device being mounted in a freely pivotal manner upon a support, a tension member adapted to connect said armature member to the vibrating subject, and means for maintaining the tension thereof, the relatively stationary position of said magnet and coil member being maintained by means of the inertia of said apparatus.

5. Mechanism for responding to mechanical vibrations and translating said vibrations into electrical vibrations comprising, in combination, means comprising a magneto-electric device for translating mechanical vibrations into electrical vibrations, said magneto-electric device being mounted in a freely pivotal manner and comprising an armature member and a magnet and coil member, said members being adapted for relative motion, the relative positions of said armature member and said magnet and coil member being maintained by means of a resilient arm mounted at one end in fixed relation to said magnet member and connected at the other end to said armature, a tension member adapted to connect the vibrating subject to said resilient arm, and means for maintaining and adjusting the tension thereof.

6. Apparatus for transforming mechanical energy into electrical energy comprising, in combination, a shaft, a frame pivotally mounted upon said shaft, a magneto-electric device mounted upon said frame, a weight eccentrically and pivotally mounted upon said shaft and adjustable in position with respect to said frame, the eccentricity of said weight being adjustable, said magneto-electric device comprising an armature member and a magnet and coil member, said members being adapted for relative motion whereby to generate current impulses in said coil, a resilient arm connecting said armature member and said magnet and coil member, said arm resisting realtive motion between said members, means for transmitting mechanical vibrations from a vibrating subject to said armature member, the relatively stationary position of the magnet and coil member being maintained by the inertia of the portion of said apparatus which is pivotally mounted upon said shaft.

7. Apparatus for responding to mechanical vibrations and translating said mechanical vibrations into electrical vibrations comprising, in combination, means adapted to be fastened rigidly to a vibrating subject and to respond to the mechanical vibrations thereof, means comprising a magneto-electric device for translating mechanical vibrations into electrical vibrations, said magneto-electric device comprising a movable armature member and a relatively stationary magnet and coil member, means comprising a lever system for transmitting said mechanical vibrations from said vibration responsive means to said translating device, said lever system being connected to and supported by said vibration responsive means at the input end of said lever system, said armature member being connected to said lever system at the output end thereof, said magnet and coil member being mounted upon and supported by said lever system at points constituting the fulcrum of said lever system, the relatively stationary position of said magnet and coil member being maintained by the inertia thereof.

8. Apparatus for transforming mechanical energy into electrical energy comprising, in combination, a coupling, means for fastening said coupling to a vibrating subject, a stud fastened to said coupling, a magneto-electric device comprising an armature member and a magnet and coil member, a lever system, said lever system at its point of energy input, being connected to and supported by said stud, said lever system being connected at its point of energy output to said armature member, said magnet and coil member being supported by said lever system at a point constituting the fulcrum thereof, the relatively stationary position of said magnet and coil member being maintained by the inertia thereof.

9. Apparatus for transforming mechanical energy into electrical energy comprising, in combination, a coupling member adapted to be fastened to a vibrating subject, a stud, means for fastening said stud to said coupling member at a single point, a magneto-electric device comprising an armature member and a magnet and coil member, and a lever system, said lever system, at its point of energy input, being connected to and supported by said stud, and being connected at its point of energy output to said armature member, said magnet and coil member being supported by said lever system at a point constituting the fulcrum thereof.

10. Apparatus for converting into electrical vibrations the mechanical vibrations set up by ball bearings under conditions simulating normal use comprising, in combination, means for rotating one of the bearing races about a fixed axis, a resiliently mounted contactor adapted to press against the other bearing race and arrest rotation but permit vibration thereof, means comprising a magneto-electric device for translating mechanical vibrations into electrical vibrations, said magneto-electric device comprising a movable armature member and a relatively stationary magnet and coil member, means connected to and supported by said contactor for transmitting mechanical vibrations from said contactor to said armature member and for amplifying said vibrations, said armature member and said magnet and coil member being attached to and supported by said vibration transmitting means at different points thereof, said magnet and coil member maintaining its relatively stationary position by its inertia.

11. Apparatus for responding to mechanical vibrations set up in ball bearings under conditions simulating normal use and for converting such vibrations into electrical vibrations comprising, in combination, a shaft adapted for rotation upon its axis, an adapter adapted to fit frictionally upon said shaft and to frictionally engage the inner race of a ball bearing, a truncated cone-shaped contacting device adapted to press against and frictionally engage the outer race of said ball bearing, a plate fastened to the base of said contacting device, a diaphragm supporting said plate, a rigid support for said diaphragm, means to adjust the plane and position of said diaphragm, a magneto-electric device for translating mechanical vibrations into electrical vibrations, said magneto-electric device comprising an armature member and a magnet and coil member, said members being adapted for relative motion, a compound lever system for transmitting said mechanical vibrations from said contacting device to said translating device, said lever system at its point of energy input being connected to and supported by said plate, said lever system being connected at its point of energy output to said armature member, said lever system, at the point constituting its fulcrum being connected to and supporting said magnet and coil member, the relatively stationary position of said magnet and coil member being maintained by its inertia, and means comprising elastic bumper blocks for damping the free vibration of the output end of said lever system, said levers being flanged metal strips, the flanges being removed locally to confine flexure of said levers to said local points.

12. Apparatus for converting into electrical vibrations the mechanical vibrations set up in ball bearings under conditions simulating normal use comprising, in combination, means for causing relative rotation of the races of a ball bearing, means for responding to the mechanical vibrations of one of said ball bearing races, means comprising an armature member and a magnet and coil member for translating said mechanical vibrations into electrical vibrations by mutual relative motion, means comprising a lever system for amplifying and transmitting said mechanical vibrations from said responding means to said translating means by flexure thereof, means for confining said flexure to predetermined points of said lever system, said magnet and coil member and said armature member being supported by said lever system and being connected to opposite sides of said points of flexure respectively, the relatively stationary position of said magnet and coil member being maintained by the inertia thereof.

13. Apparatus for transforming mechanical energy into electrical energy comprising, in combination, means adapted to make contact with the subject for responding to the vibrations thereof, means comprising a magneto-electric device for translating mechanical vibrations into electrical vibrations, said magneto-electric device comprising an armature member and a magnet and coil member, said members being adapted for relative motion, means comprising a lever for transmitting by flexure thereof, said mechanical vibrations from said vibrating subject to said magneto electric device, and means for confining the flexure of said lever to a predetermined point thereof, said armature member and said magnet and coil member being connected to said lever at opposite sides of said point of flexure respectively, said magnet and coil member maintaining its quasi-stationary position by reason of its inertia.

14. Apparatus for transforming mechanical energy into electrical energy comprising, in combination, a fixed support, a contactor resiliently mounted upon said support, a magneto-electric device for translating mechanical vibrations into electrical vibrations, said magneto-electric device comprising an armature member and a magnet and coil member, said members being adapted for relative motion, said magnet and coil member being movably mounted upon a support, means including a lever system for transmitting mechanical vibrations from said contactor to said translating means, one end of said system being connected to said armature member and the other end to said contactor, said system being connected to said magnet and coil member at a point intermediate said ends, the relatively stationary position of said magnet and coil member being maintained by the inertia thereof.

15. Apparatus for transforming mechanical energy into electrical energy comprising, in combination, a contactor adapted to make contact with a vibrating subject, a magneto-electric device for translating mechanical vibrations into electrical vibrations, said magneto-electric device comprising an armature member and a magnet and coil member, said members being adapted for relative motion, said magnet and coil member being movably mounted upon a support, means including a lever system for transmitting mechanical vibrations from said contactor to said translating means, one end of said system being connected to said armature member and the other end to said contactor, said system being connected to said magnet and coil member at a point intermediate said ends, the relatively stationary position of said magnet and coil member being maintained by the inertia thereof.

HALLETT H. GERMOND.